United States Patent Office 3,234,920
Patented Feb. 15, 1966

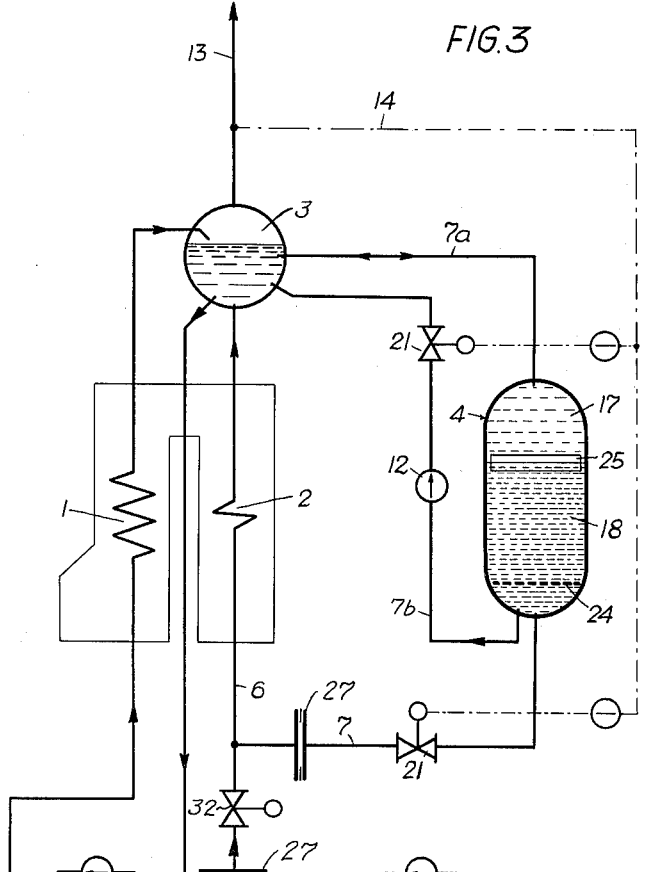
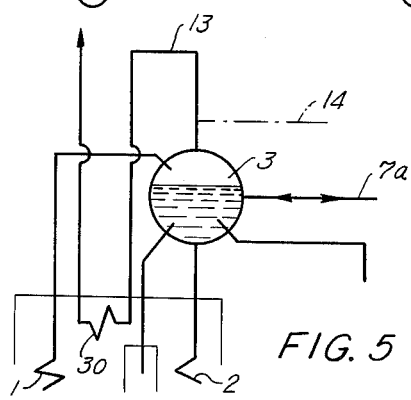

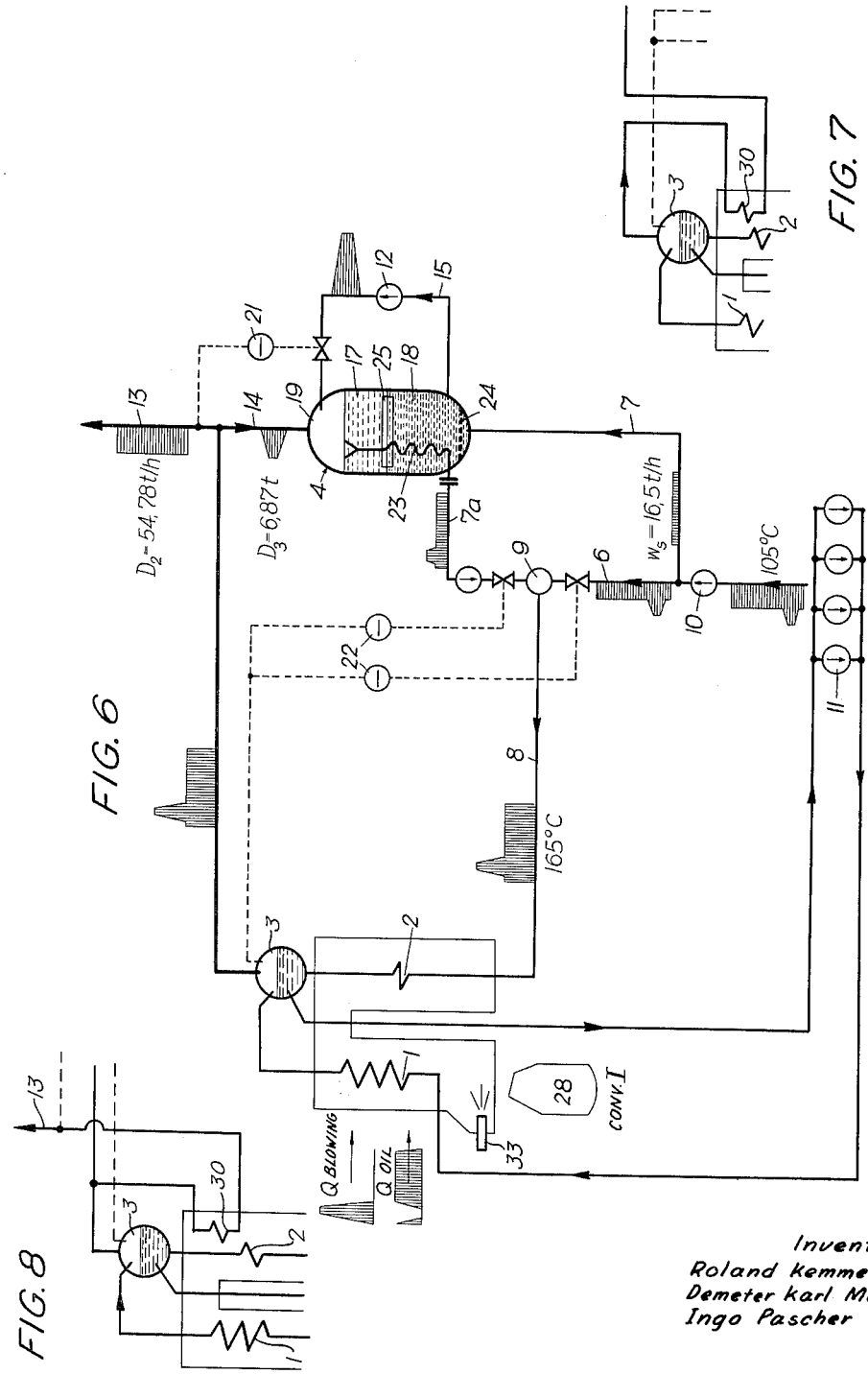

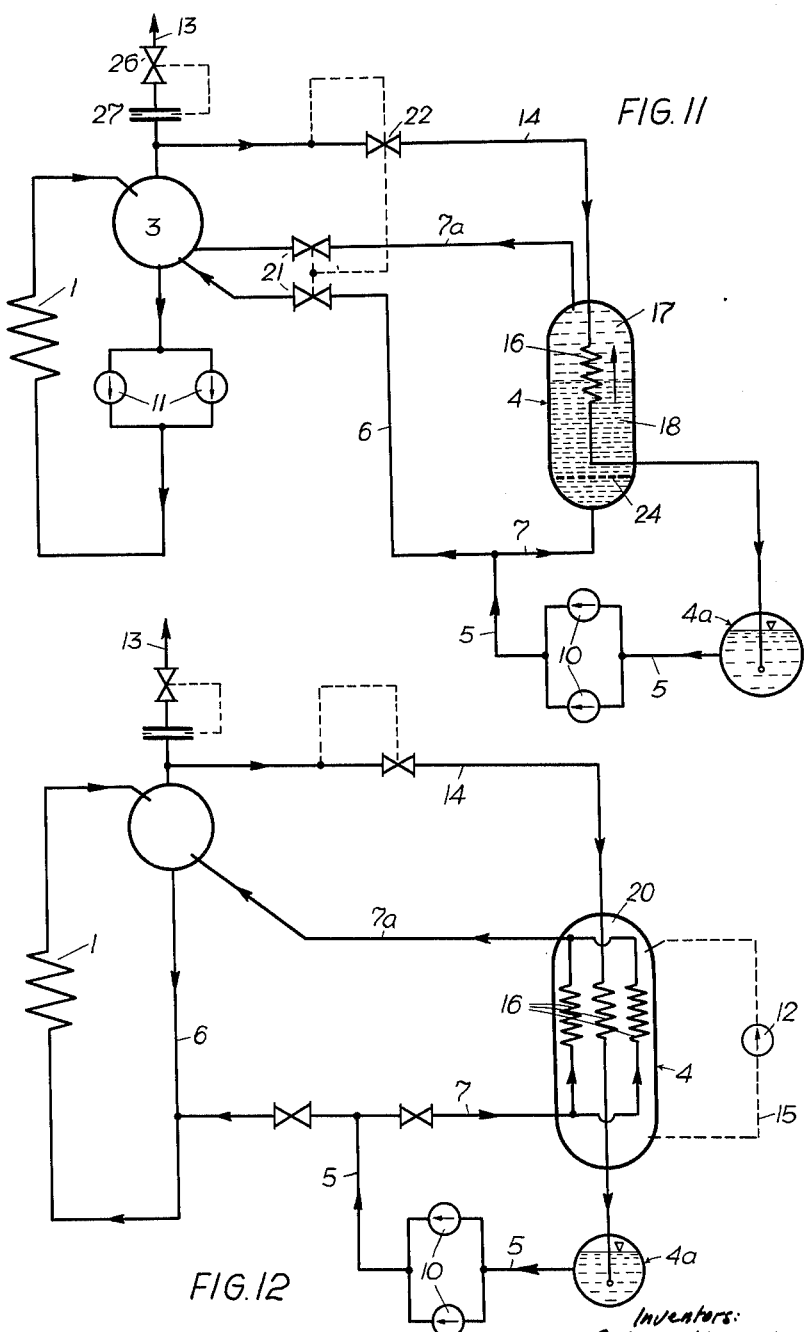

3,234,920
METHOD AND APPARATUS FOR REMOVING STEAM PEAKS FROM PROCESS WASTE HEAT UTILIZERS WITH VARIABLE STEAM GENERATION
Roland Kemmetmüller, Vienna, Demeter Karl Markow, Graz, and Ingo Pascher, Graz-Kroisbach, Austria, assignors to Waagner-Biró Aktiengesellschaft, Vienna, Austria, a firm of Austria
Filed Jan. 15, 1962, Ser. No. 166,039
Claims priority, application Austria, Jan. 20, 1961,
A 489/61, A 491/61, A 492/61
14 Claims. (Cl. 122—7)

In intermittently operated steel converters with steam generating plants connected in series therewith it is difficult to place in a steam net the steam peaks obtained approximately every forty or sixty minutes during operation of the converters. There are different measures known and suggested for partially or completely equalizing these steam peaks.

It is for instance known to turn on an additional heating in the time between two blowing periods. This additional heating results in a higher average steam production over the period; thus the surplus amount with respect to the average and therefore also the accumulator (reservoir) volume become smaller. A compensation is gained for instance through different steam accumulator circuit-arrangements, that is by the installation of Ruths-accumulators which can be variously connected with respect to the boiler. From the gradient and the volume of the accumulator results the amount of accumulated steam. For a complete compensation of such steam peaks a relatively large accumulator volume and a high design-pressure must be provided. Further a circuit-arrangement is known wherein the steam of the accumulators is passed once more to the boiler superheater or where the superheating temperature is gained only in a separately heated superheater. Further certain equivalent circuits are known which allow the feed pump output to be made smaller; this can be attained either by considerably enlarging the boiler drum which then together with the entire pipe system of the boiler functions as an accumulator itself or by connecting the boiler drum and one accumulator drum in parallel, in order to enlarge the water volume and thus the accumulator capacity.

There are known further circuit-arrangements and processes wherein a part of the steam taken off the accumulator is used for preheating the boiler feed-water by means of reduction stations.

The use of enlarged accumulator contents of the drum or shunted accumulators and drums has the disadvantage that the pressure in the boiler system varies in the scope of the accumulator pressure. The accumulator circuit-arrangements with mere Ruths-accumulators with a pressure control at the inlet side and at the outlet side at constant boiler pressure have the disadvantage that for mastering the peaks large accumulator volumes are required whereby accumulator and boiler must be constructed for the high pressure side.

The invention therefore is based on the idea of keeping the boiler pressure constant, of keeping the feed-water temperature at the boiler inlet also as constant as possible, and nevertheless to be able to operate the entire system with a low pressure, that is with a pressure which corresponds in an accumulator circuit-arrangement with Ruths-accumulators to the outlet pressure, and thus to save not only substantial investment costs for boiler and accumulator but also operating costs by a substantial reduction of the necessary feed pump output. According to the invention this is obtained in that one or several secondary drums are used as feed-water preheaters and feed-water accumulators which are charged during the process period and are discharged during the process interval.

In the drawing the object of the invention is shown by way of example. FIG. 1 shows a diagram of a known plant, whereas FIG. 2 shows the corresponding diagram of a plant according to the invention.

FIG. 3 shows a diagram of connection of a plant according to the invention whereas FIG. 4 shows a modified embodiment of a plant of such kind and FIG. 5 shows a partial diagram of a further modification.

FIG. 6 shows a circuit-arrangement of another plant according to the invention whereas the FIGS. 7 and 8 show respectively partial diagrams of somewhat modified embodiments of such plants.

Figure 9:
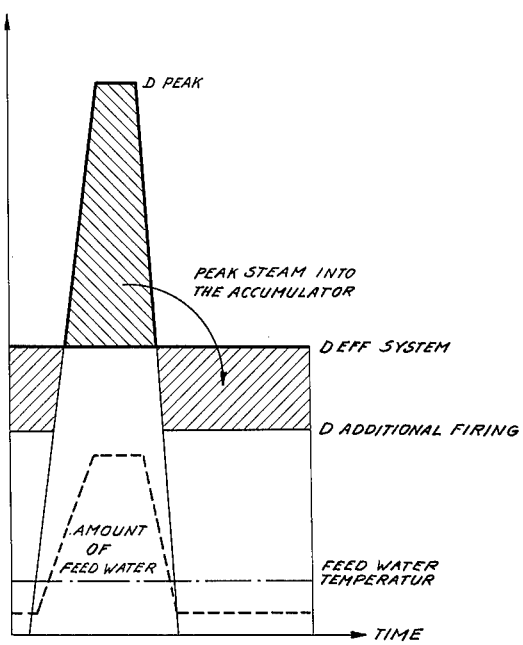
Figure 10:
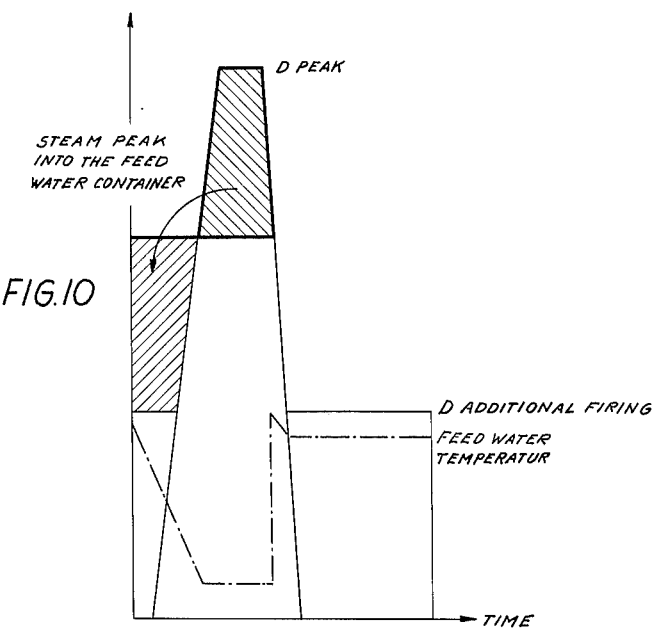

In the FIGS. 9 to 12 the object of the invention is shown in a somewhat different circuit-arrangement by way of example. FIG. 9 shows a diagram of a known plant whereas FIG. 10 shows the corresponding diagram of a plant according to the invention. FIG. 11 shows a circuit-arrangement of an inventive plant whereas FIG. 12 shows a somewhat modified embodiment of plants of such kind.

Figure 1:
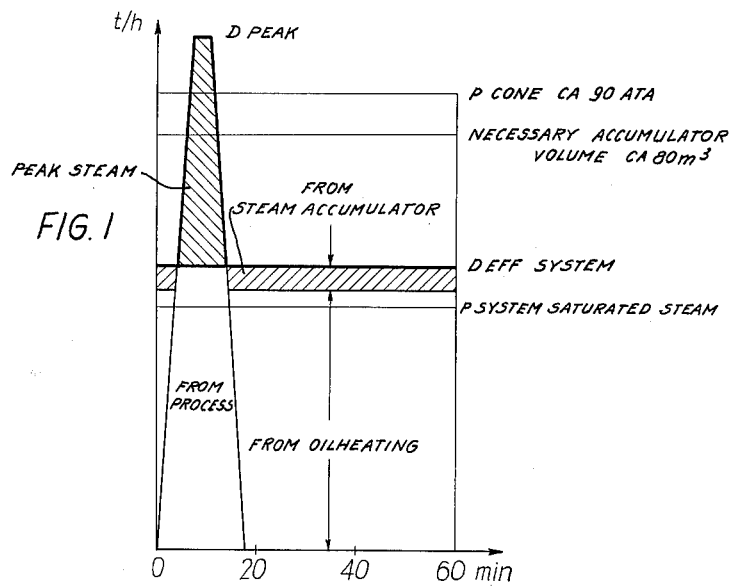

FIG. 1 illustrates the conditions with the known installation of a steam gradient accumulator and with a feed-water temperature of for instance 105° C. The amount of peak steam is passed to a Ruths-accumulator and increases during the blowing time its pressure of outlet working pressure of e.g. 47 ata. to the primary pressure of e.g. 84 ata. Boiler system, accumulator, pipe-lines and pumps thus are to be constructed for design-pressure of e.g. 88 ata.

The continuous amount of steam which may be obtained from the blowing operation, the additional heating and the accumulator and delivered to the net, as well as the high pressure accumulator volume required, are shown in the diagram.

Figure 2:
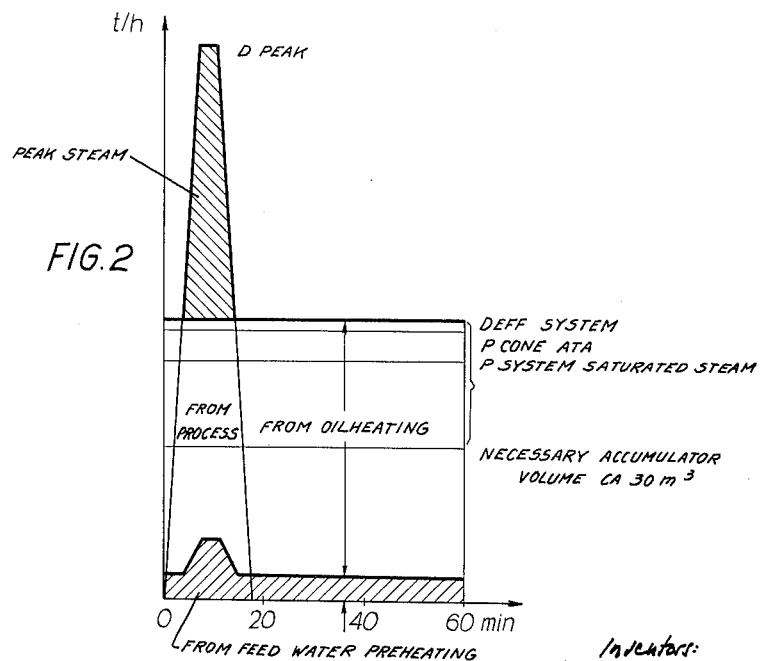

FIG. 2 shows the corresponding conditions with a feed-water mixing preheating to e.g. 165° C. by the process according to the invention with an equal additional heating output.

The design-pressure of the system and the volume of the feed-water container in relation to the steam accumulator are about half as large as with the usual processes the results of which were shown in FIG. 1.

As may be seen from FIG. 3 a feed-water container 4 is connected on the boiler drum waterside to a converter waste heat boiler having evaporator heating surfaces 1, economizer 2 and boiler drum 3; the container 4 is supplied with cold feed-water through a branch line 7 of the feed-pump pressure line 6 from below and for better distribution of the cold feed-water through throttling members 24 in the lower part of the container. The feed pump 10, or for safety's sake two feed pumps 10 in parallel, deliver through a line 5 cold feed-water which during the blowing period is passed directly through the main line 6 to the economizer 2 of the forced-flow boiler. Measuring devices 27 are respectively provided in lines 5 and 7 and an additional valve 32 is provided in lines 5 for shutting off this line. The boiler has two circulating pumps 11 and is intended to deliver a continuous amount of steam to the consumers through the line 13. Thus the surplus amounts of heat forming during the blowing period of the converter are delivered as hot boiler drum water through the line 7a to the upper part of the feed-water container 4; there accumulates a hot water volume 17 which becomes larger and larger whereas the cold feed-water 18 in the lower part of the container 4 is forced into the boiler through the line 7b and the pump 12. For a better separation of cold water volume and hot water volume in the feed-water container 4 a separating float 25 is provided. During the blowing interval of the converter the situation is inverted; the boiler feed pump 10 mainly feeds cold feed-water to the lower part of the feed-water container, said cold water displaces the hot water accumulated at the top through the line 7a into the boiler drum. The boiler thus fed with hot water can deliver the required amount of steam with a small additional heating only. A control preferably is effected by the steam pressure in the consumer line through a control line 14 and control members 21.

FIG. 3 shows the circuit arrangement with cold feeding of the boiler; thus during the blowing time the entire or nearly the entire amount of feed-water is passed through the economizer, whereas during the blowing interval, that is to say during the operation of the additional heating only a minimum part of the feed-water is passed through the economizer and the remainder through the container.

Figure 4:
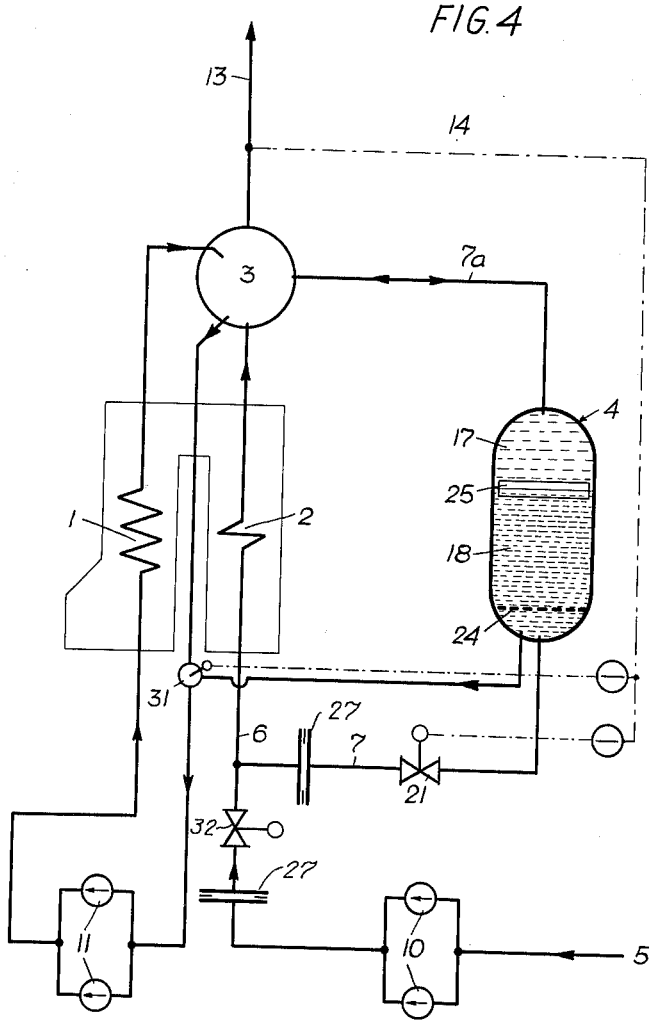

In the embodiment according to FIG. 4 the lower part of the feed-water container 4 is not directly connected to the boiler drum 3 but to a mixing valve 31 in the inlet line of the circulating pumps 11.

The embodiment according to FIG. 5 differs from the preceding embodiment above all by a superheater 30 provided in the boiler, said superheater superheating the steam passed to the consumers.

As may be learned from FIG. 6 the waste heat of a converter 28 is used in a boiler 1 with a boiler drum 3 and a feed-water preheater 2 for producing steam which is intended to be fed to the consumers through a line 13 in a continuous supply. However, the blowing time of the converter is short; therefore an additional heating, 33 is provided for operation during the blowing intervals. In order to be able to keep this additional heating as small as possible the surplus amount of peak steam is passed to a feed-water container 4 through a line 14 during the blowing time where it is condensed and forms a hot water supply 17 above which a steam cushion 19 is provided.

A branch line 7 of the feed-pump pressure line is connected to the lower part of the vertically arranged feed-water container 4 in which a distributing throttle 24 is preferably arranged.

The feed pump 10 delivers a part of cold feed-water from the feed-water inlet line 5 through the branch line 7 to the lower part 18 of the feed-water container 4 and another part through the main line 6 to a mixer 9; wherein hot water from the upper part 17 of the feed-water container 4 is admixed and delivered at a predetermined temperature in the mixing line 8. Hot water is taken off the upper part 17 of the feed-water container 4 through a taking off float 25 which separates the cold water volume 18 from the hot water and which is connected to the outlet pipe 7a through a flexible connection 23. The boiler is fed from a mixing line 8 through an economizer 2 into the boiler drum 3.

The temperature of the mixture is controlled from the boiler drum 3 through control lines 22 so that the boiler is operated with a temperature as constant as possible during the blowing interval where an additional heating is turned on, as well as during the blowing period.

A circulating line 15 with a circulating pump 12 serve for revolving the water contents in the feed-water container 4. The control is effected at constant steam supply automatically by way of a controlling member 21 by steam pressure or by the steam supply to the container or to the consumer. The boiler is a forced-flow boiler with four circulating pumps 11 and thus is operated with a constant or a two-stage feed-water temperature. The quantities revolved in the single lines of the system are shown diagrammatically on each of the lines.

In FIG. 7 substantially the same plant is shown; the difference is that a superheater 30 is provided in the boiler which is passed by the entire quantity of steam produced in the boiler.

In the circuit arrangement shown in FIG. 8, however, the superheater is passed only by that part of the steam produced which is delivered to the consumers at 13, whereas the steam peak produced during the blowing period is directly delivered as saturated steam to the feed-water container 4.

FIG. 9 illustrates the conditions with a known installation of a steam gradient accumulator and a constant feed-water temperature. The peak steam amount is passed to a Ruths-accumulator and during the blowing period increases its pressure from the outlet working pressure to the primary pressure of the boiler system.

The continuous amount of steam delivered to the net by the blowing operation, the additional heating and the accumulator is shown in the diagram. Further the variations of the amount of water fed to the boiler and the feed-water temperature which is constant during the entire period are shown in broken lines.

FIG. 10 shows the corresponding conditions the feed-water is mixed and preheated according to the inventive process with the same additional heating input. According to this process the upper part of the steam peak is passed to the feed-water container during the blowing time heating thereby the water therein. By means of this heat it is possible to advance the start of the additional delivery of steam. This is effected by passing feed-water having a high temperature to the boiler already at the beginning of or shortly before the blowing time. During the steam peak the boiler water temperature has its lowest value and rises subsequently due to the heat transfer from the steam peak. During the process interval, feed-water having a high and nearly constant temperature is fed to the boiler.

As may be learned from FIG. 11 the heated evaporator heating surfaces 1 of the boiler are connected with the boiler drum 3 for a forced-flow; for safety's sake two circulating pumps 11 are provided. The saturated steam produced is passed to the consumers through a steam supply line 13; thereby the steam valve 26 is controlled by a measuring device 27. The surplus peak steam obtained during the blowing time of the converter, not shown, is passed to a feed-water container 4 through the line 14; there said steam transfers its heat in a heat exchanger 16 to the water contents of the feed-water container 4 and subsequently condenses in the feed-water stock container 4a. Thereby also the remaining heat is extracted. From the feed-water stock container 4a the relatively cold feed-water is drawn off by the feed pump 10 which for safety's sake also is provided in duplicate, and is passed through the feed-water supply line 5 either to the main line 6 and/or to the branch line 7 to which the feed-water container 4 is connected. The water from the branch line 7 is passed to the lower part of the vertically arranged feed-water container wherein for a more equal distribution throttling members 24 are arranged. In the feed-water container 4 the feed-water is heated by the peak-steam in the heat-exchanger 16; thus during the blowing time of the converter a hot water volume 17 accummulating in the upper part of the feed-water container increases whereas the cold water portion 18 in the lower part decreases correspondingly as the boiler during this time is fed with cold feed-water merely or mainly through the main line 6.

After the blowing time of the converter is over, feeding through the main line 6 is stopped and feeding is effected mainly from the upper part of the feed-water container 4 through the line 7a. Thus, already preheated feed-water is passed to the boiler which is operated only with a smaller additional heating and thus is enabled to maintain the delivery of steam to the consumers. Of course, no surplus steam is now available for the heat exchanger 16; therefore the warm water stock 17 in the feed-water container decreases whereas the cold water volume 18 is increased to the same extent by feeding. The control of these operations is effected by automatically and remotely controlled valves 22 and 21 which are installed in the steam line 14 and in the lines 7a and 6. In the circuit arrangement according to FIG. 12 the main line 6 is not fed into the boiler drum 3 but into the fall pipe of the boiler which is operated with natural flow or forced flow. The container 4 here is filled with a liquid 20 having a high boiling point as for instance glycerin, oils, mercury and so on; with said liquid the heat exchange is effected through heat exchanger 16, and that for the peak steam as well as for the feed-water.

The heat retaining liquid 20 may also be revolved through a container circulating line 15 having container circulating pumps 12.

This circuit-arrangement has the advantage that due to the specific liquid used small pressures are prevailing in the container 4; therefore the container can be made at correspondingly low costs.

We claim:

1. A method of equalizing steam peaks in a waste gas steam boiler using cyclically produced waste heat, comprising the steps of feeding, during the period of the cycle in which waste heat is produced, all of the feed water into an economizer heated by the waste heat; feeding the thus heated feed water into the steam boiler; feeding part of the hot feed water from the boiler into a displacement type feed water accumulator; and displacing thereby cold feed water contained in the accumulator into the boiler; feeding, during the period of the cycle in which no waste heat is produced, only a small fraction of the feed water through the economizer into the boiler and the remainder of the feed water into the displacement type feed water accumulator; displacing thereby hot feed water stored in the accumulator during the first mentioned period into said boiler to provide at the end of said last mentioned period a maximum increase of the amount of cold water in said feed water accumulator; and heating said steam boiler during the period in which no waste heat is produced with additional heating means.

2. A method as set forth in claim 1 including the step of controlling the feeding of hot water from the boiler into the accumulator and resulting displacement of cold water from the accumulator during the first mentioned period and feeding of cold water into the accumulator and resulting displacement of hot water therefrom during the second period in response to the steam pressure in the boiler.

3. A method as set forth in claim 1 including the step of controlling the amount of feed water fed during the last mentioned period respectively through the feed water accumulator and through the economizer in response to the steam pressure in the boiler.

4. A method as set forth in claim 1 and including the step of superheating the steam produced in the boiler.

5. A method of equalizing steam peaks in a waste gas steam boiler using cyclically produced waste heat, comprising the steps of feeding, during the period of the cycle in which waste heat is produced, all of the feed water into an economizer heated by the waste heat; feeding the thus heated feed water into the steam boiler; feeding part of the hot feed water from the boiler into a displacement type feed water accumulator; displacing thereby cold feed water contained in the accumulator; mixing the cold feed water displaced from the accumulator with hot water from the boiler; at least partly evaporating the mixture; feeding, during the period of the cycle in which no waste heat is produced, only a small fraction of the feed water through the economizer into the boiler and the remainder of the feed water into the displacement type feed water accumulator; displacing thereby hot feed water stored in the accumulator during the first mentioned period into said boiler; and heating said steam boiler during the period in which no waste heat is produced with additional heating means.

6. In a steam boiler for utilizing cyclically produced waste heat, in combination, a boiler drum adapted to be filled up to a predetermined level with liquid; an economizer adapted to be heated by the cyclically produced waste heat and communicating with said boiler drum; a displacement type feed water accumulator having opposite ends; first conduit means for providing communication between said boiler drum below the level of liquid therein and one end of said feed water accumulator; second conduit means for providing communication between said boiler drum below the level of liquid therein and the other end of said feed water accumulator; cold feed water supply means; means for selectively controlling flow of cold feed water from said cold feed water supply means to said economizer communicating with said boiler drum and to said other end of said feed water accumulator so that during the period of the cycle in which the economizer is heated by the waste heat all of the feed water may be fed through the heated economizer into the boiler drum while during the period in which no waste heat is produced only part of the cold feed water is fed through the economizer and the remainder of the feed water is fed into said other end of said feed water accumulator to displace thereby hot water stored therein during the first mentioned period into said boiler; and additional heating means for heating said steam boiler during the period of the cycle in which no waste heat is produced.

7. In a steam boiler for utilizing cyclically produced waste heat, in combination, a boiler drum adapted to be filled up to a predetermined level with liquid; an economizer adapted to be heated by the cyclically produced waste heat and communicating with said boiler drum; an upright elongated displacement type feed water accumulator having an upper end and a lower end; first conduit means for providing communication between said boiler drum below the level of liquid therein and said upper end of said feed water accumulator; second conduit means for providing communication between said boiler drum below the level of liquid therein and said lower end of said feed water accumulator; cold feed water supply means; means for selectively controlling flow of cold feed water from said cold feed water supply means to said economizer communicating with said boiler drum and to said lower end of said feed water accumulator so that during the period of the cycle in which the economizer is heated by the waste heat all of the feed water may be fed through the heated economizer into the boiler drum while during the period in which no waste heat is produced only part of the cold feed water is fed through the economizer and the remainder of the feed water is fed into said lower end of said feed water accumulator to displace thereby hot water stored therein during the first mentioned period into said boiler; and additional heating means for heating said steam boiler during the period of the cycle in which no waste heat is produced.

8. In a steam boiler for utilizing cyclically produced waste heat, in combination, a boiler drum adapted to be filled up to a predetermined level with liquid; an economizer adapted to be heated by the cyclically produced waste heat and communicating with said boiler drum; an upright elongated displacement type feed water accumulator having an upper end and a lower end; first conduit means for providing communication between said boiler drum below the level of liquid therein and said upper end of said feed water accumulator; second conduit means for providing communication between said boiler drum below the level of liquid therein and said lower end of said feed water accumulator; throttling means extending transverse through said feed water accumulator adjacent said lower end thereof; cold feed water supply means; means for selectively controlling flow of cold feed water from said cold feed water supply means to said economizer communicating with said boiler drum and to said lower end of said feed water accumulator so that during the period of the cycle in which the economizer is heated by the waste heat all of the feed water may be fed through the heated economizer into the boiler drum while during the period in which no waste heat is produced only part of the cold feed water is fed through the economizer and the remainder of the feed water is fed into said lower end of said feed water accumulator to displace thereby hot water stored therein during the first mentioned period into said boiler; and additional heating means for heating said steam boiler during the period of the cycle in which no waste heat is produced.

9. A steam boiler as set forth in claim 6, and including evaporating means communicating at one end thereof with said steam boiler above the liquid level; an adjustable mixing valve in said second conduit means; and third conduit means providing communication between said mixing valve and the other end of said evaporating means so that said evaporating means is supplied with a mixture of hot water from said boiler drum and cold water from said feed water accumulator depending on the adjustment of said adjustable mixing valve.

10. A steam boiler as set forth in claim 9 and means operatively connected to said mixing valve and to the interior of said steam boiler for automatically adjusting said mixing valve in dependence on the steam pressure produced by said boiler.

11. A steam boiler as set forth in claim 7 and including separating means in said feed water accumulator for keeping the hot water separated from the cold water in said accumulator.

12. A steam boiler as set forth in claim 10 in which said separating means are in the form of a floating piston.

13. A steam boiler as set forth in claim 6 and including a circulating pump in said second conduit means.

14. A steam boiler as set forth in claim 6 and including evaporating means communicating with said steam boiler; and third conduit means providing communication between said second conduit means and said evaporating means.

References Cited by the Examiner

UNITED STATES PATENTS

| | | | |
|---|---|---|---|
| 1,265,020 | 5/1918 | Zublin | 122—35 |
| 1,659,836 | 2/1928 | Ruths | 122—32 |
| 2,550,822 | 5/1951 | Kielland | 122—35 |

FOREIGN PATENTS

| | | |
|---|---|---|
| 210,445 | 8/1960 | Austria. |
| 425,987 | 3/1926 | Germany. |
| 549,113 | 4/1932 | Germany. |
| 832,762 | 2/1952 | Germany. |
| 214,965 | 12/1924 | Great Britain. |
| 335,812 | 10/1930 | Great Britain. |
| 285,178 | 5/1931 | Italy. |

FREDERICK L. MATTESON, Jr., *Primary Examiner.*

PERCY L. PATRICK, CHARLES SUKALO, *Examiners.*